United States Patent
Ando

(10) Patent No.: US 11,528,230 B2
(45) Date of Patent: Dec. 13, 2022

(54) TRANSMISSION DEVICE, METHOD, AND RECORDING MEDIUM

(71) Applicant: NEC Corporation, Tokyo (JP)

(72) Inventor: Toshikazu Ando, Tokyo (JP)

(73) Assignee: NEC CORPORATION, Tokyo (JP)

(*) Notice: Subject to any disclaimer, the term of this patent is extended or adjusted under 35 U.S.C. 154(b) by 89 days.

(21) Appl. No.: 16/966,213

(22) PCT Filed: Feb. 20, 2019

(86) PCT No.: PCT/JP2019/006220
§ 371 (c)(1),
(2) Date: Jul. 30, 2020

(87) PCT Pub. No.: WO2019/167734
PCT Pub. Date: Sep. 6, 2019

(65) Prior Publication Data
US 2021/0051106 A1 Feb. 18, 2021

(30) Foreign Application Priority Data
Feb. 27, 2018 (JP) .............................. JP2018-033080

(51) Int. Cl.
*H04L 12/851* (2013.01)
*H04L 12/803* (2013.01)
(Continued)

(52) U.S. Cl.
CPC .......... *H04L 47/245* (2013.01); *H04L 47/125* (2013.01); *H04L 47/41* (2013.01)

(58) Field of Classification Search
CPC ...... H04L 47/245; H04L 47/125; H04L 47/41
See application file for complete search history.

(56) References Cited

U.S. PATENT DOCUMENTS

| 8,937,865 B1* | 1/2015 | Kumar | H04L 47/76 370/235 |
| 10,225,193 B2* | 3/2019 | Judge | H04L 47/125 |

(Continued)

FOREIGN PATENT DOCUMENTS

| JP | 2006-005437 A | 1/2006 |
| JP | 2007-180891 A | 7/2007 |

(Continued)

OTHER PUBLICATIONS

International Search Report for PCT Application No. PCT/JP2019/006220, dated May 7, 2019.

(Continued)

*Primary Examiner* — Huy D Vu
*Assistant Examiner* — Bailor C Hsu
(74) *Attorney, Agent, or Firm* — Sughrue Mion, PLLC

(57) ABSTRACT

According to the present invention, in order to allow enhancement in the transmitting efficiency of a transmission system using link aggregation, if the bandwidth usage rates of the physical links constituting the LAG are imbalanced, identification information of a factor packet that serves as a factor for the imbalance is estimated on the basis of a distribution rule and the second information about a data amount. In addition, the factor packet is distributed to physical links to which the factor packet is distributed, and a packet that is not the factor packet is distributed according to the distribution rule, which is based on, for each of the physical links constituting the LAG, a remaining bandwidth obtained by subtracting the usage bandwidth of the factor packet distributed to said physical link from the maximum available bandwidth of said physical link.

20 Claims, 8 Drawing Sheets

(51) Int. Cl.
   *H04L 12/891* (2013.01)
   *H04L 47/24* (2022.01)
   *H04L 47/125* (2022.01)
   *H04L 47/41* (2022.01)

(56) References Cited

U.S. PATENT DOCUMENTS

| | | | |
|---|---|---|---|
| 2004/0136379 A1* | 7/2004 | Liao | H04L 47/781 |
| | | | 370/254 |
| 2005/0276263 A1 | 12/2005 | Suetsugu et al. | |
| 2008/0291826 A1* | 11/2008 | Licardie | H04L 47/32 |
| | | | 370/230 |
| 2011/0090789 A1* | 4/2011 | Fung | H04L 41/5025 |
| | | | 370/230 |
| 2011/0110248 A1 | 5/2011 | Koitabashi et al. | |
| 2013/0286842 A1 | 10/2013 | Nakatsugawa | |
| 2014/0016470 A1 | 1/2014 | Li | |
| 2014/0119193 A1* | 5/2014 | Anand | H04L 45/28 |
| | | | 370/237 |
| 2014/0198656 A1* | 7/2014 | Venkatesh | H04L 45/30 |
| | | | 370/235 |
| 2015/0138986 A1* | 5/2015 | Gale | H04L 47/125 |
| | | | 370/237 |
| 2015/0327113 A1 | 11/2015 | Nishioka | |

FOREIGN PATENT DOCUMENTS

| | | |
|---|---|---|
| JP | 2011-103614 A | 5/2011 |
| JP | 5696726 B2 | 4/2015 |
| WO | 2013/125177 A1 | 8/2013 |

OTHER PUBLICATIONS

English translation of Written opinion for PCT Application No. PCT/JP2019/006220, dated May 7, 2019.
Tomoya Hatano, Yasunobu Kasahara, Shin-ichi Yoshihara, Yoichi Kataoka, and Yoichi Maeda "Dynamic Link Changeover Method for Utilizing Bandwidth", IEICE Technical Report, Oct. 21, 2004, vol. 104 No. 380, pp. 7 to 11, Japan.

\* cited by examiner

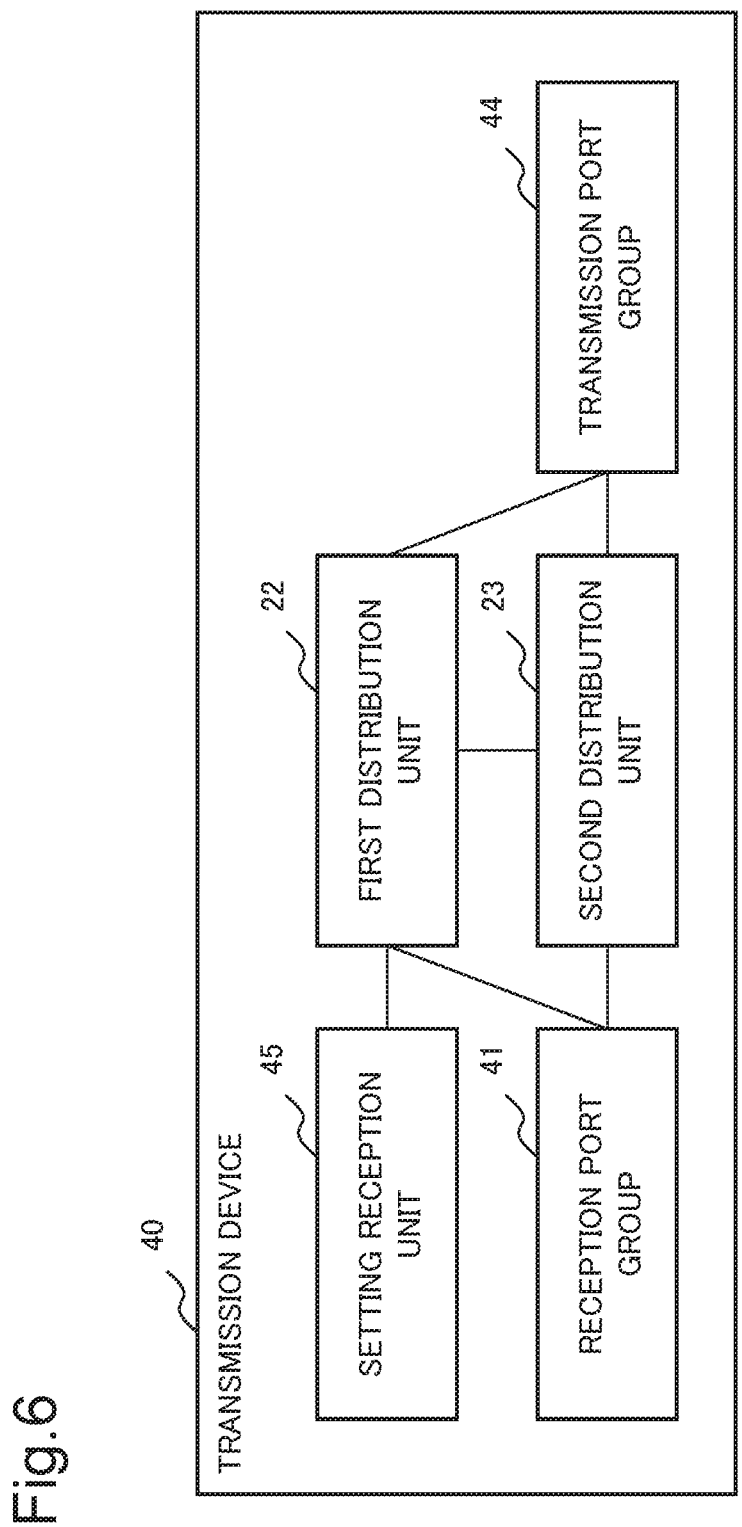

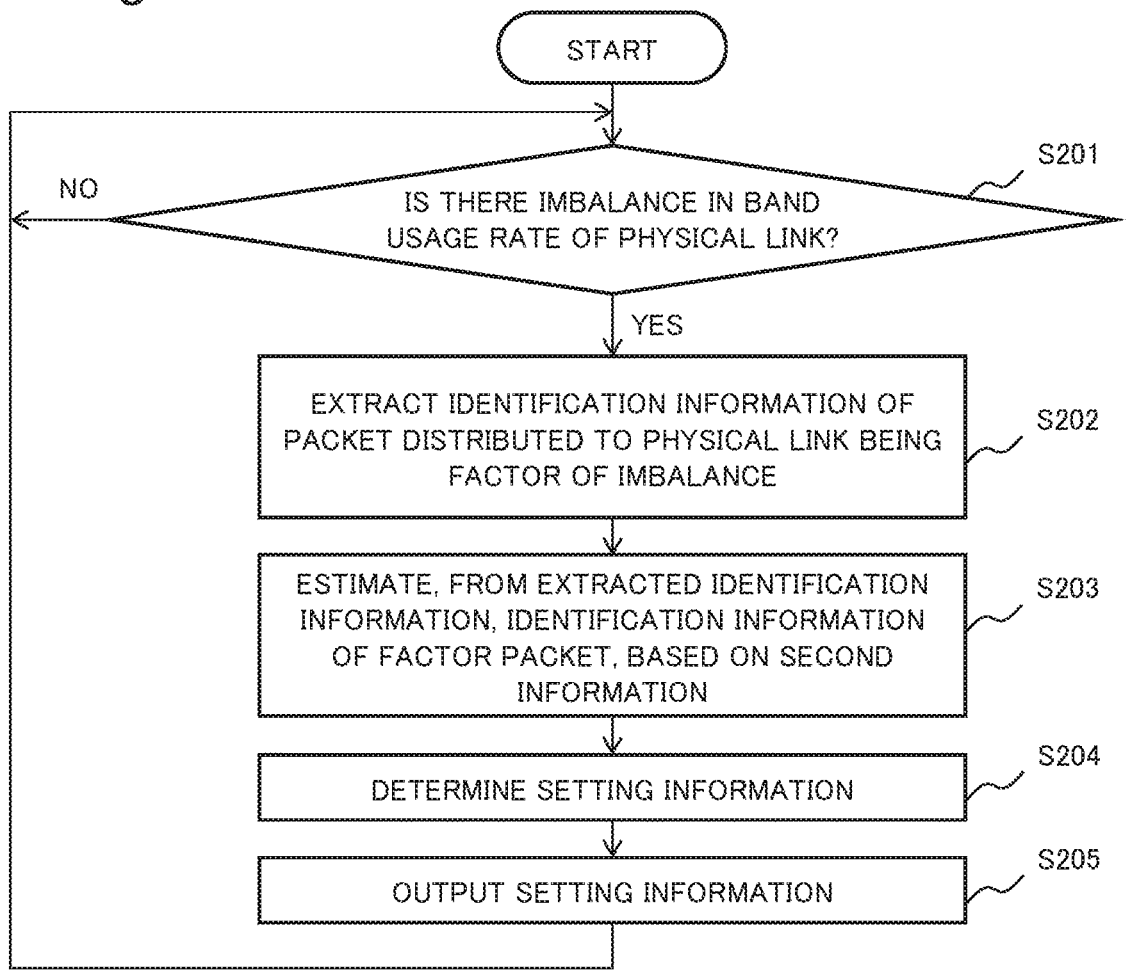

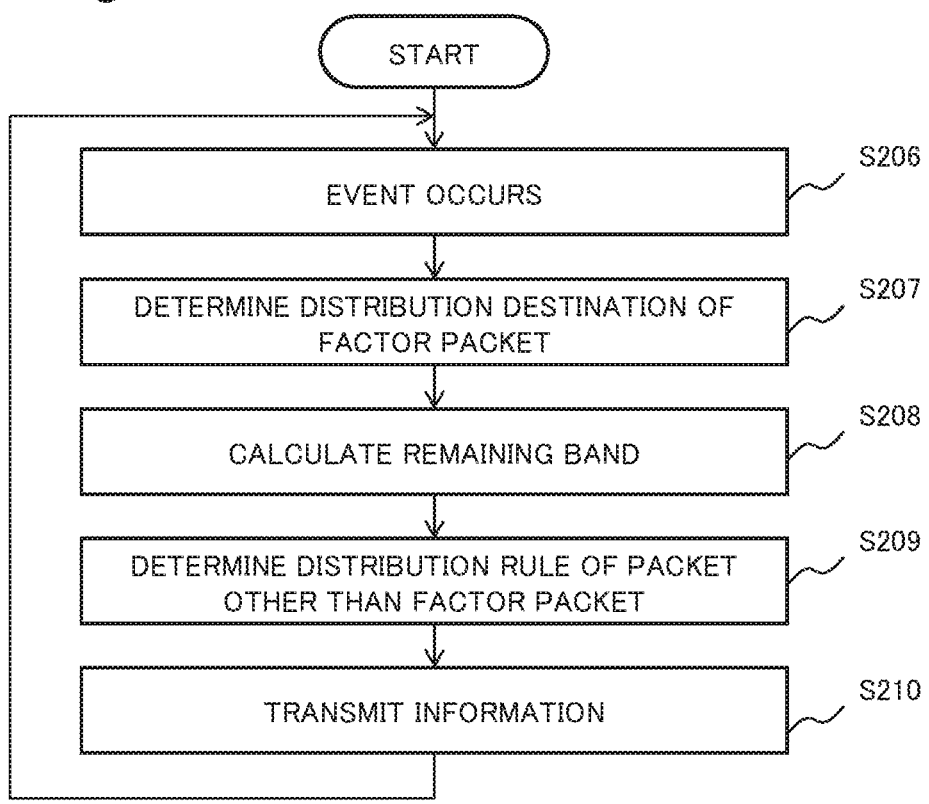

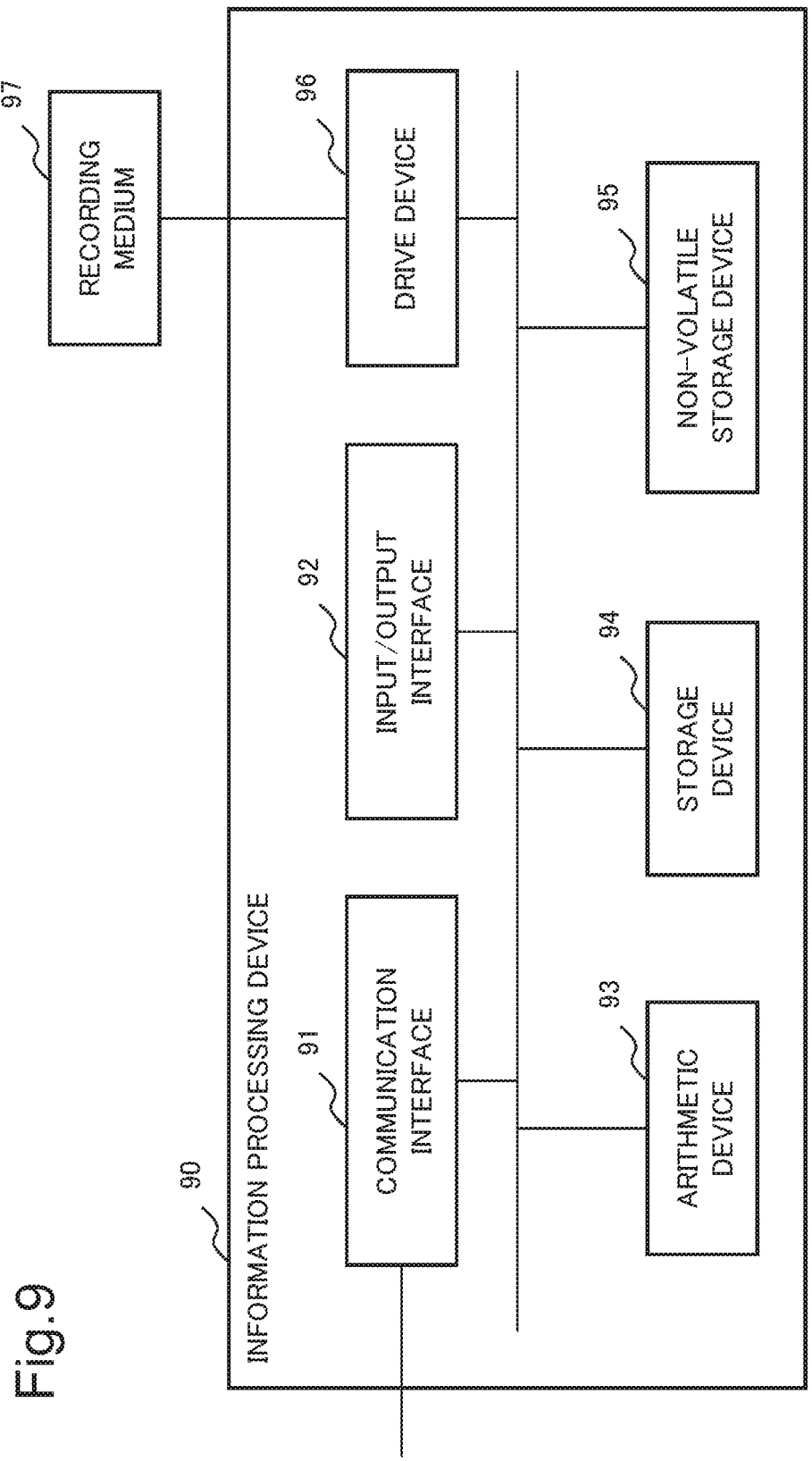

TRANSMISSION DEVICE, METHOD, AND RECORDING MEDIUM

This application is a National Stage Entry of PCT/JP2019/006220 filed on Feb. 20, 2019, which claims priority from Japanese Patent Application 2018-033080 filed on Feb. 27, 2018, the contents of all of which are incorporated herein by reference, in their entirety.

TECHNICAL FIELD

The present invention relates to a transmission monitoring device, a transmission device, a system, a method, and a recording medium in a transmission system using link aggregation.

BACKGROUND ART

Link aggregation is a technique for handling a plurality of physical links as one logical link. A group of a plurality of physical links to be handled as one logical link is referred to as a link aggregation group (LAG). In a transmission device using link aggregation, each packet is distributed to a physical link constituting an LAG in accordance with a distribution rule determined in advance.

Generally, a transmission device distributes each packet to each physical link in a flow unit, based on identification information such as a media access control (MAC) address and an internet protocol (IP) address of a transmission source/transmission destination. For example, a distribution rule is determined in such a way that a ratio of the number of pieces (number of flows) of identification information to be distributed to each physical link becomes equal to a ratio of a maximum available band of each physical link.

However, in this method, there is a possibility that, when there is imbalance in identification information of a packet to be transmitted, a packet amount distributed to a specific physical link may exceed a maximum available band, even when there is vacancy in a band of an LAG. A packet that is unable to be transmitted may be discarded in accordance with priority control by a class of service (CoS) value or the like, after being shaped (buffered).

When packet discard occurs at a level of a data link layer, a transmission device can recognize, by a packet counter provided in each physical link, that packet discard has occurred, and there is vacancy in another physical link. However, in a transmission device using link aggregation, generally, since flow control at a level of a network layer is not performed, it is not possible to specify a flow which becomes a cause of packet discard.

When packet discard occurs, a sending device for performing data transmission via the transmission device suppresses a transmission amount of an IP packet to be output from the sending device by flow control at a level of a network layer or a higher layer. Consequently, a transmission amount from the sending device is suppressed even when there is vacancy in the band of the LAG, and transmitting efficiency may be lowered.

In order to equalize a load of a physical link within an LAG, a method is proposed in which a communication amount per unit time is measured for each of pieces of identification information serving as a key for packet distribution, and a flow is distributed according to the communication amount. In order to measure a communication amount for each of pieces of identification information, a large amount of packet counters are necessary. However, it is economically difficult to secure a memory for a large amount of counters within a transmission device. Further, it is difficult in terms of processing ability to allow the transmission device to operate a large amount of counters. When using, as a key for distribution, identification information other than a MAC address and an IP address, such as a virtual local area network (VLAN) in accordance with the Institute of Electrical and Electronic Engineers (IEEE) 802.1Q is taken into consideration, the number of counters further increases.

In a method described in PTL 1, traffic is divided into guarantee traffic of an amount equivalent to a guarantee rate, and exceeding traffic of an amount exceeding the guarantee rate, the guarantee traffic is preferentially distributed, and the exceeding traffic is distributed to a vacant band. Thus, discard of the exceeding traffic is suppressed, and thereby transmitting efficiency is enhanced.

In a method described in PTL 2, low priority traffic is distributed, based on a ratio of a vacant band in which a band to be used by high priority traffic is excluded. Thus, communication quality of the high priority traffic is guaranteed.

CITATION LIST

[Patent Literature]
 [PTL 1] Japanese Patent No. 5696726
 [PTL 2] International Publication No. WO2013/125177

SUMMARY OF INVENTION

Technical Problem

However, in the method described in PTL 1, the exceeding traffic is distributed to the vacant band with respect to a target flow for which a band is guaranteed. Consequently, when a transmission amount of a flow other than the target flow for which a band is guaranteed is large, there is a possibility that packet discard occurs, and thus transmitting efficiency may be lowered.

In the method described in PTL 2, the low priority traffic is distributed, based on the ratio of the vacant band in which the band to be used by the high priority traffic is excluded. Therefore, when there is imbalance in identification information of a packet to be transmitted by the low priority traffic, there is a possibility that packet discard occurs exclusively in a specific physical link, and transmitting efficiency may be lowered.

An object of the present invention is to provide a transmission monitoring device, a transmission device, a system, a method, and a recording medium that enable enhancement of transmitting efficiency of a transmission system using link aggregation.

[Solution to Problem]

In order to solve the above-described problem, a transmission monitoring device according to the present invention includes: a first information reception means for receiving first information relating to a band usage rate of each of physical links constituting a link aggregation group; a second information reception means for receiving second information relating to a data amount of each of pieces of identification information of a packet passing through the physical link; and a factor packet estimation means for, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

A transmission device according to the present invention includes: a packet reception means for receiving a packet; a first distribution means for, when the received packet is a factor packet serving as a factor of imbalance in a band usage rate of a physical link constituting a link aggregation group, distributing the received packet to a physical link being a distribution destination of the factor packet; and a second distribution means for, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

A transmission monitoring method according to the present invention includes: receiving first information relating to a band usage rate of each of physical links constituting a link aggregation group; receiving second information relating to a data amount of each of pieces of identification information of a packet passing through the physical link; and, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

A transmission method according to the present invention includes: receiving a packet; when the received packet is a factor packet serving as a factor of imbalance in a band usage rate of a physical link constituting a link aggregation group, distributing the received packet to a physical link being a distribution destination of the factor packet; and, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

A transmission monitoring program stored in a computer-readable recording medium according to the present invention causes a computer to achieve: a first information reception function of receiving first information relating to a band usage rate of each of physical links constituting a link aggregation group; a second information reception function of receiving second information relating to a data amount of each of pieces of identification information of a packet passing through the physical link; and a factor packet estimation function of, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

A transmission program stored in a computer-readable recording medium according to the present invention causes a computer to achieve: a packet reception function of receiving a packet; a first distribution function of, when the received packet is a factor packet serving as a factor of imbalance in a band usage rate of a physical link constituting a link aggregation group, distributing the received packet to a physical link being a distribution destination of the factor packet; and a second distribution function of, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

[Advantageous Effects of Invention]

A transmission monitoring device, a transmission device, a system, a method, and a recording medium according to the present invention enable enhancing transmitting efficiency of a transmission system using link aggregation.

BRIEF DESCRIPTION OF DRAWINGS

FIG. 6 is a diagram illustrating a configuration example of the transmission device according to the second example embodiment of the present invention.

FIG. 7 is a diagram illustrating an operation example of the transmission monitoring device according to the second example embodiment of the present invention.

FIG. 8 is a diagram illustrating an operation example of the transmission device according to the second example embodiment of the present invention.

FIG. 9 is a diagram illustrating a hardware configuration example according to each of the example embodiments of the present invention.

EXAMPLE EMBODIMENT

First Example Embodiment

A first example embodiment according to the present invention is described.

Figure 1:
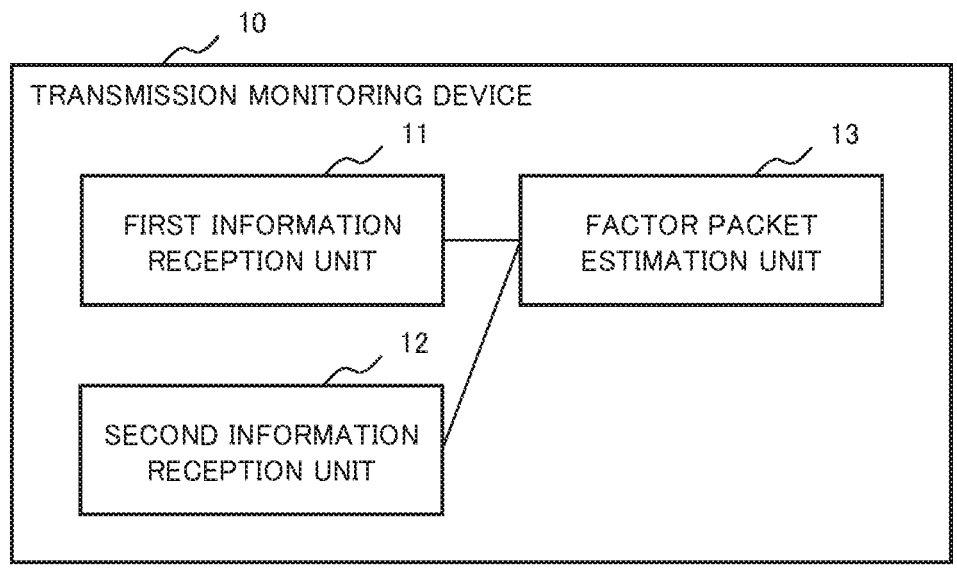
FIG. 1 is a diagram illustrating a configuration example of a transmission monitoring device according to first and second example embodiments of the present invention.

FIG. 1 illustrates a configuration example of a transmission monitoring device 10 according to the present example embodiment. The transmission monitoring device 10 according to the present example embodiment is constituted of a first information reception unit 11, a second information reception unit 12, and a factor packet estimation unit 13.

The first information reception unit 11 receives first information relating to a band usage rate of each of physical links constituting a link aggregation group (LAG). The second information reception unit 12 receives second information relating to a data amount of each of pieces of identification information of a packet passing through the physical link. The factor packet estimation unit 13 outputs, when there is imbalance in the band usage rate of the physical link constituting the LAG, identification information of a factor packet serving as a factor of the imbalance, which is estimated based on a distribution rule and the second information. The distribution rule indicates a correspondence between identification information of a packet, and a physical link being a distribution destination of the packet.

Figure 2:
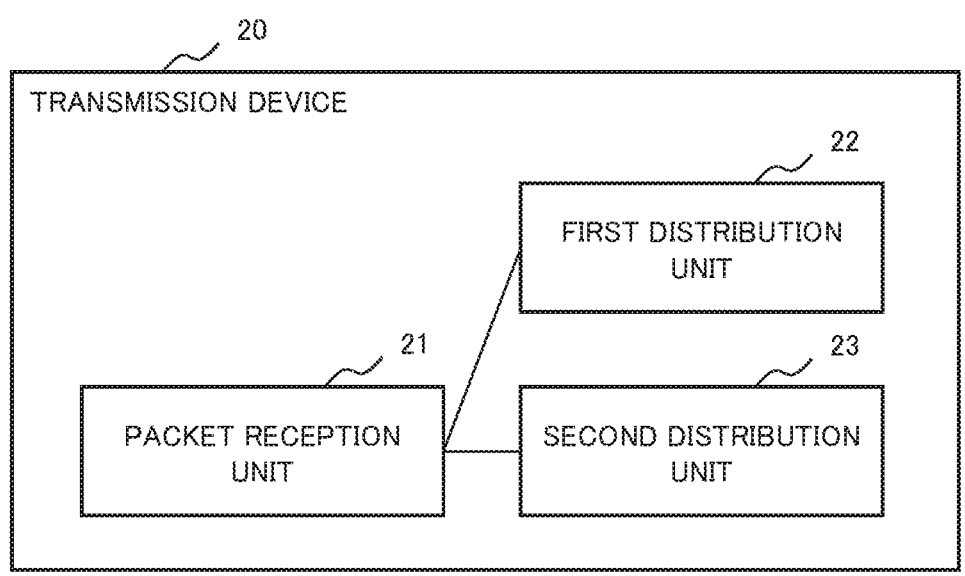
FIG. 2 is a diagram illustrating a configuration example of a transmission device according to the first example embodiment of the present invention.

FIG. 2 illustrates a configuration example of a transmission device 20 according to the present example embodiment. The transmission device 20 according to the present example embodiment is constituted of a packet reception unit 21, a first distribution unit 22, and a second distribution unit 23.

The packet reception unit 21 receives a packet. When the received packet is a factor packet serving as a factor of imbalance in the band usage rate of the physical link constituting the LAG, the first distribution unit 22 distributes the received packet to a physical link being a distribution destination of the factor packet. When the received packet is not the factor packet, the second distribution unit 23 distributes the received packet in accordance with the distribution rule. The distribution rule is based on a remaining band, which is acquired by subtracting, from a maximum available band of the physical link, a usage band of the factor packet in which the physical link is a distribution destination for each of physical links constituting the LAG.

By configuring the transmission monitoring device 10 and the transmission device 20 as described above, when there is imbalance in a band usage rate of a physical link constituting an LAG, the transmission monitoring device 10 estimates and outputs a factor packet serving as a factor of the imbalance. The transmission device 20 distributes the factor packet to a physical link being a distribution destination of the factor packet. The transmission device 20 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance the transmitting efficiency of a transmission system using link aggregation.

Figure 3:
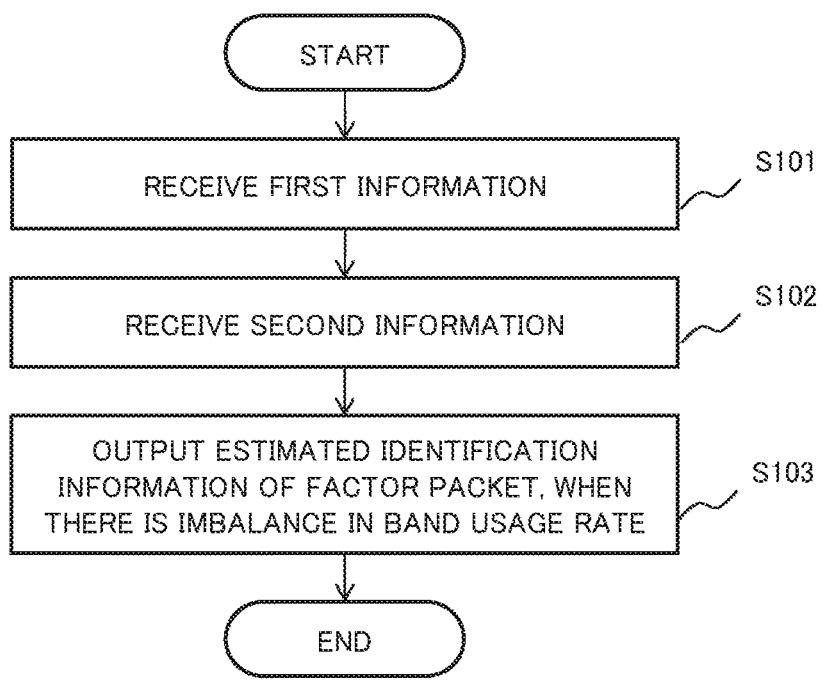
FIG. 3 is a diagram illustrating an operation example of the transmission monitoring device according to the first example embodiment of the present invention.

Next, FIG. 3 illustrates an example of an operation of the transmission monitoring device 10 according to the present example embodiment.

The first information reception unit 11 receives the first information relating to a band usage rate of each of physical links constituting an LAG (Step S101). The second information reception unit 12 receives the second information relating to a data amount of each of pieces of identification information of a packet passing through the physical link (Step S102). The factor packet estimation unit 13 outputs, when there is imbalance in the band usage rate of the physical link constituting the LAG, identification information of a factor packet serving as a factor of the imbalance, which is estimated based on the distribution rule and the second information (Step S103).

Figure 4:
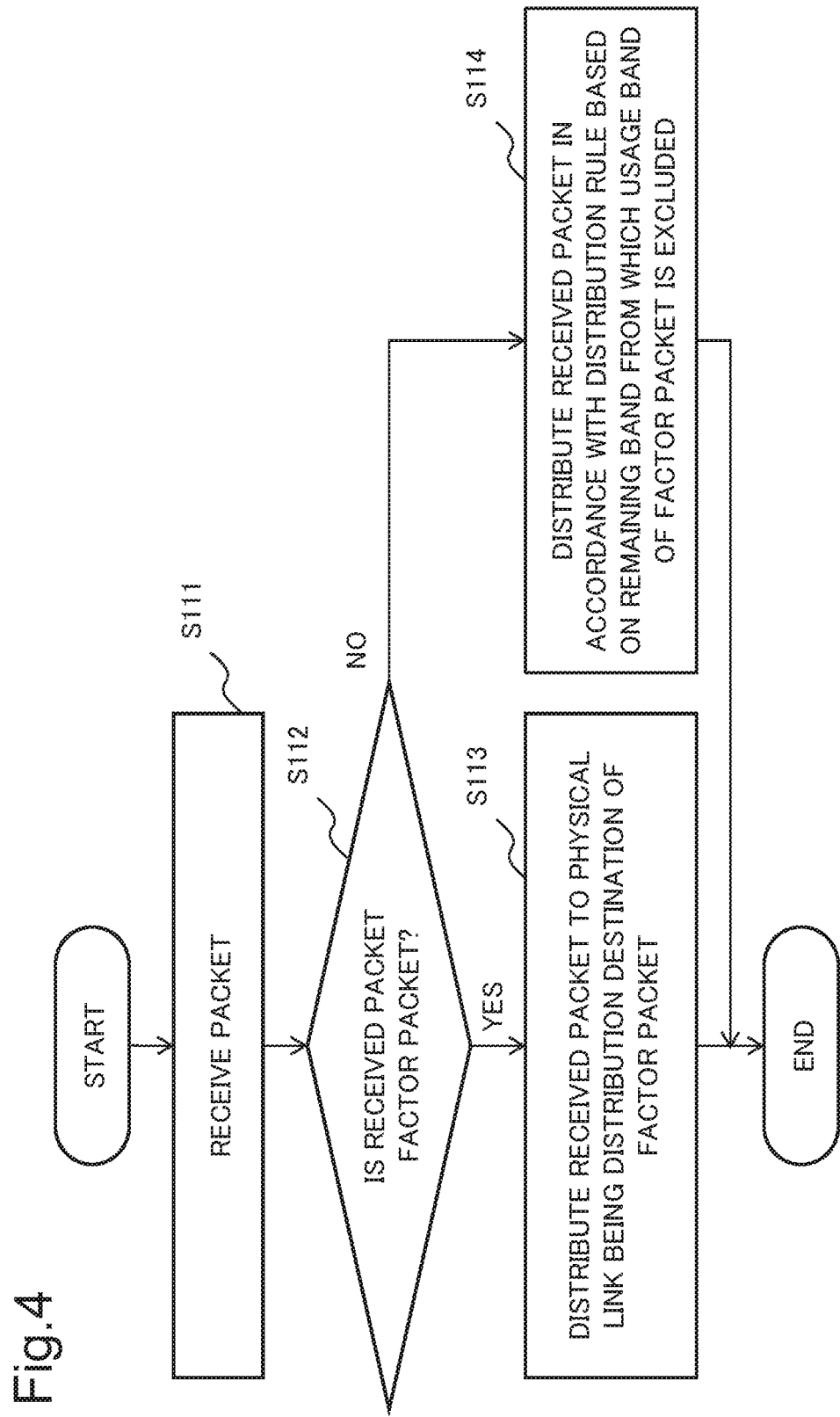
FIG. 4 is a diagram illustrating an operation example of the transmission device according to the first example embodiment and a transmission device according to the second example embodiment of the present invention.

Next, FIG. 4 illustrates an example of an operation of the transmission device 20 according to the present example embodiment.

The packet reception unit 21 receives a packet (Step S111). When the received packet is the factor packet (YES in Step S112), the first distribution unit 22 distributes the received packet to a physical link being a distribution destination of the factor packet (Step S113). When the received packet is not the factor packet (NO in Step S112), the second distribution unit 23 distributes the received packet in accordance with the distribution rule (Step S114). The distribution rule is based on a remaining band, which is acquired by subtracting, from a maximum available band of the physical link, a usage band of the factor packet in which the physical link is a distribution destination for each of physical links constituting the LAG.

By being operated as described above, when there is imbalance in a band usage rate of a physical link constituting an LAG, the transmission monitoring device 10 estimates and outputs a factor packet serving as a factor of the imbalance. The transmission device 20 distributes the factor packet to a physical link being a distribution destination of the factor packet. The transmission device 20 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance the transmitting efficiency of a transmission system using link aggregation.

As described above, in the first example embodiment according to the present invention, when there is imbalance in a band usage rate of a physical link constituting an LAG, the transmission monitoring device 10 estimates and outputs a factor packet serving as a factor of the imbalance. The transmission device 20 distributes the factor packet to a physical link being a distribution destination of the factor packet. The transmission device 20 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance transmitting efficiency of a transmission system using link aggregation.

Second Example Embodiment

Next, a second example embodiment according to the present invention is described. In the present example embodiment, a transmission system using a transmission monitoring device 10 and a transmission device 40 is specifically described.

Figure 5:
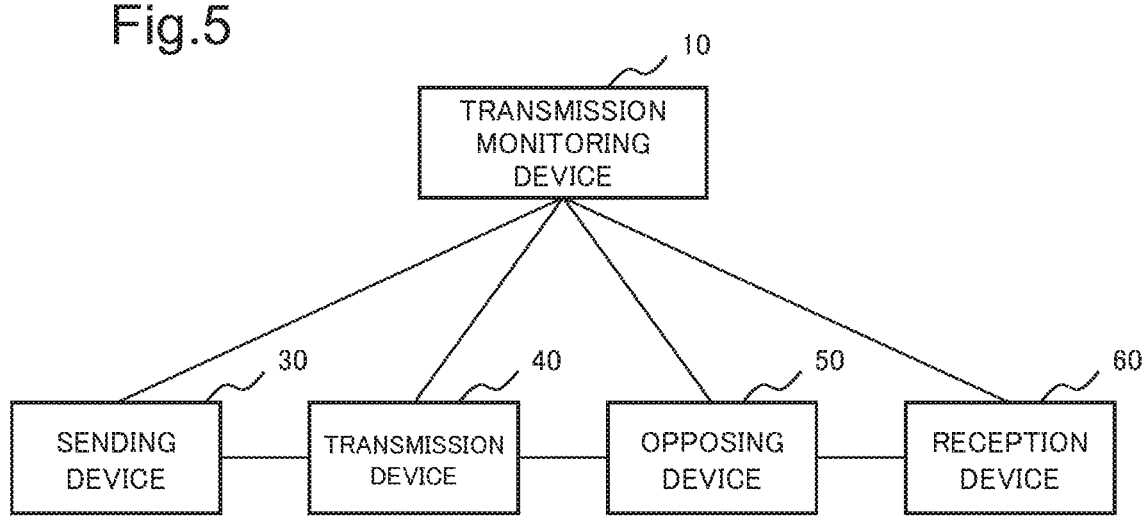
FIG. 5 is a diagram illustrating a configuration example of a transmission system according to the second example embodiment of the present invention.

First, FIG. 5 illustrates a configuration example of the transmission system according to the present example embodiment. The transmission system according to the present example embodiment is constituted of the transmission monitoring device 10, a sending device 30, the transmission device 40, an opposing device 50, and a reception device 60.

The sending device 30 is a device for sending a packet toward the reception device 60. The reception device 60 is a device for receiving the packet sent by the sending device 30. The sending device 30 and the reception device 60 each has a function of a layer equal to or higher than a network layer, and is able to perform flow control.

The transmission device 40 and the opposing device 50 are devices present on a path between the sending device 30 and the reception device 60, and configured to transfer the packet sent by the sending device 30 toward the reception device 60. The transmission device 40 and the opposing device 50 each has a function of link aggregation, and a physical link between the transmission device 40 and the opposing device 50 constitutes an LAG. The transmission device 40 and the opposing device 50 mainly perform packet transmission control at a level of a data link layer.

The transmission device 40 receives a packet from one or more sending devices 30, and transmits the packet to one or more opposing devices 50. The transmission device 40 determines an opposing device 50 being a transfer destination of the packet received from the sending device 30 by referring to an address resolution protocol (ARP) table, and transmits the received packet to the opposing device 50 being the transfer destination. The opposing device 50 receives the packet from one or more transmission devices 40, and transmits the packet to one or more reception devices 60.

The transmission monitoring device 10 is a device for monitoring the transmission system. The transmission monitoring device 10 receives necessary information from each of the devices within the transmission system, and performs setting relating to packet distribution in link aggregation for the transmission device 40.

A communication line between the transmission monitoring device 10 and another device (the sending device 30, the transmission device 40, the opposing device 50, and the reception device 60) may be a communication line dedicatedly used for monitoring, or may be a communication line of a transmission service provided by the transmission system.

When the transmission device 40 is able to achieve a function of the transmission monitoring device 10, the transmission device 40 may have a function of the transmission monitoring device 10.

Next, a configuration example of the transmission monitoring device 10 according to the present example embodiment is described. A configuration example of the transmission monitoring device 10 according to the present example embodiment is similar to the configuration example (FIG. 1) of the transmission monitoring device 10 according to the first example embodiment.

A first information reception unit 11 receives first information relating to a band usage rate of each of physical links constituting an LAG. In the present example embodiment, the first information reception unit 11 receives the first information from a transmission device (the transmission device 40 or the opposing device 50) for transmitting a packet by using a physical link constituting the LAG.

Specifically, a port counter provided in each of physical ports of a transmission port group 44 of the transmission device 40 measures a transmission data amount of each of the physical ports. The first information reception unit 11 receives, from the transmission device 40, a transmission data amount (usage band) per unit time of each of the physical ports. Then, the first information reception unit 11 derives a band usage rate by dividing a usage band of each of the physical ports by a maximum available band of the physical port. Conversion from a transmission data amount into a usage band and conversion from a usage band into a band usage rate may be performed by the transmission device 40, or may be performed by the first information reception unit 11 of the transmission monitoring device 10.

However, regarding a physical port to which a "factor packet" is allocated, the first information reception unit 11 calculates a band usage rate by subtracting, from a usage band and a maximum available band of the physical port, a usage band of the "factor packet". The "factor packet" will be described later.

The first information reception unit 11 may receive the first information not from the transmission device 40 but from the opposing device 50. In this case, a port counter provided in each of physical ports of a reception port group of the opposing device 50 measures a reception data amount of each of reception ports. However, in this case, it is necessary for the transmission device 40 or the opposing device 50 to recognize to which physical port of the transmission port group 44 of the transmission device 40, each of the reception ports of the opposing device 50 is connected by using a protocol such as a link layer discovery protocol (LLDP).

A second information reception unit 12 receives the second information relating to a data amount of each of pieces of identification information of a packet. The identification information is, for example, information serving as a key for packet distribution in the transmission device 40, such as a transmission source MAC address, a transmission destination MAC address, a transmission source IP address, a transmission destination IP address, and a VLAN.

In the present example embodiment, the second information reception unit 12 receives the second information from the sending device 30 for sending a packet passing through a physical link constituting an LAG. The sending device 30 sends, to the transmission monitoring device 10, the second information relating to a transmission data amount of each of pieces of identification information of the packet. When the transmission device 40 is able to grasp the second information, the transmission device 40 may have a function of the transmission monitoring device 10.

The transmission monitoring device 10 is able to easily grasp a data amount of each of pieces of identification information by receiving the second information from the sending device 30. When the sending device 30 measures a data amount of each of pieces of identification information, the sending device 30 may measure a transmission data amount of data to be sent by the own device. However, when the transmission device 40 measures a data amount of each of pieces of identification information, the transmission device 40 is required to measure the data amount of each of pieces of the identification information regarding data received from each of the sending devices 30. Therefore, when the transmission device 40 measures a data amount of each of pieces of identification information, a memory of a large amount is necessary.

In the present example embodiment, since the sending device 30 measures a data amount of each of pieces of identification information, a memory amount and a processing amount required for one device are reduced, and it becomes easy to grasp the data amount of each of pieces of the identification information.

When there is imbalance in a band usage rate of a physical link constituting an LAG, a factor packet estimation unit 13 estimates identification information of a factor packet serving as a factor of the imbalance, and outputs the estimated identification information of the factor packet.

The factor packet estimation unit 13 determines whether there is imbalance in a band usage rate of a physical link constituting an LAG, based on the first information as follows, for example.

The factor packet estimation unit 13 calculates an average value (average band usage rate) of band usage rates of physical links constituting an LAG. Next, the factor packet estimation unit 13 calculates an imbalance difference by subtracting, from a maximum value of the band usage rate of the physical link constituting the LAG, the average band usage rate. When the imbalance difference exceeds a predetermined value (first value), the factor packet estimation unit 13 determines that there is imbalance.

When imbalance is present, the factor packet estimation unit 13 determines a physical link being a factor of the imbalance as follows, for example.

The factor packet estimation unit 13 determines, as a physical link being a factor of imbalance, a physical link in which the band usage rate is maximum among the physical links constituting the LAG. Alternatively, the factor packet estimation unit 13 may determine, as a physical link being a factor of imbalance, a physical link in which the band usage rate is larger than a sum of the average band usage rate and a predetermined value (second value). In this case, two or more physical links may be determined to be physical links being a factor of imbalance.

When there is imbalance in the band usage rate of the physical link constituting the LAG, the factor packet estimation unit 13 estimates identification information of a factor packet serving as a factor of the imbalance as follows, for example.

The factor packet estimation unit 13 grasps in advance a distribution rule, in the transmission device 40, indicating a correspondence between identification information of a packet and a physical link being a distribution destination of the packet. The factor packet estimation unit 13 extracts, from the distribution rule of the transmission device 40, identification information of a packet to be distributed to a physical link being a factor of imbalance. Then, the factor packet estimation unit 13 estimates, as the identification information of the factor packet, identification information in which the data amount is maximum among the extracted identification information, based on the second information. Alternatively, the factor packet estimation unit 13 may estimate, as the identification information of the factor packet, identification information in which a ratio of a data amount with respect to a total value of a data amount of the extracted identification information exceeds a predetermine ratio.

In this way, by using information relating to a band usage rate of each of physical links, information relating to a data amount of each of pieces of identification information, and a distribution rule, the factor packet estimation unit 13 is able to estimate identification information of a factor packet serving as a factor of imbalance.

The factor packet estimation unit 13 outputs, to the transmission device 40, the estimated identification information of the factor packet. Alternatively, the factor packet estimation unit 13 may add currently estimated information on the factor packet, to setting information output to the transmission device 40 last time, and output the setting information to the transmission device 40.

The setting information includes identification information and a usage band of each of factor packets to be set in the transmission device 40. The factor packet estimation unit 13 adds the identification information and the usage band of the factor packet estimated by the above-described method, to the setting information output to the transmission device 40 last time. The usage band of the factor packet is a data amount (second information) of the factor packet.

The factor packet estimation unit 13 updates the usage band of each of factor packets registered in the setting information, based on the second information.

However, there is an upper limit on the number of pieces of identification information of factor packets settable in the transmission device 40. Therefore, when the number of pieces of identification information of factor packets registered in the setting information has already reached an upper limit, identification information of a factor packet in which the usage band is smaller than that of a factor packet estimated this time, and identification information of the factor packet estimated this time are interchanged with each other.

When a user grasps in advance that a packet having certain identification information increases in a certain period, the transmission monitoring device 10 may receive identification information of the packet by user's input on setting, and add the identification information to the setting information for the transmission device 40.

Next, a configuration example of the transmission device 40 according to the present example embodiment is described with reference to FIG. 6. The transmission device 40 according to the present example embodiment is constituted of a reception port group 41, a first distribution unit 22, a second distribution unit 23, the transmission port group 44, and a setting reception unit 45. The reception port group 41, the first distribution unit 22, and the second distribution unit 23 in FIG. 6 are equivalent to the packet reception unit 21, the first distribution unit 22, and the second distribution unit 23 of the configuration example (FIG. 2) of the transmission device 20 according to the first example embodiment.

The reception port group 41 is a group of physical ports for receiving a packet sent by the sending device 30. The reception port group 41 determines a device being a transfer destination of the received packet. When the transfer destination of the packet is the opposing device 50, the reception port group 41 outputs the packet to the first distribution unit 22 for the opposing device 50.

The transmission port group 44 is a group of physical ports belonging to an LAG addressed to the opposing device 50. The transmission port group 44 transmits, to a reception port of the opposing device 50, a packet addressed to the opposing device 50. The transmission port group 44 performs shaping of a packet in a case of congestion, and priority control based on a type of service (ToS)/Cos, or the like for each of physical ports.

The setting reception unit 45 receives, from the transmission monitoring device 10, setting information on a factor packet. The setting information includes identification information and a usage band of each of factor packets.

The reception port group 41 receives a packet from the sending device 30.

The first distribution unit 22 receives, from the transmission port group 44, information on link-up/link-down, and a maximum available band of each of physical links, information on a usage band, and the like. The first distribution unit 22 determines a physical link being a distribution destination for each of factor packets, and transmits, to the transmission monitoring device 10, information on a physical link being a distribution destination of a factor packet.

When a packet received by the reception port group 41 is a factor packet, the first distribution unit 22 distributes the received packet to a physical link being a distribution destination of the factor packet. When the packet received by the reception port group 41 is not the factor packet, the first distribution unit 22 outputs the received packet to the second distribution unit 23.

The second distribution unit 23 calculates a remaining band by subtracting, from a maximum available band, a usage band (received by the setting reception unit 45) of the factor packet in which the physical link is a distribution destination for each of physical links. Then, the second distribution unit 23 determines a distribution rule of a packet that is not the factor packet, based on the remaining band of each of the physical links. The second distribution unit 23 transmits information on the determined distribution rule to the transmission monitoring device 10.

The second distribution unit 23 distributes the packet received from the first distribution unit 22, specifically, a packet that is not the factor packet to either of the physical links constituting the LAG in accordance with the distribution rule.

In the above-described description, the first distribution unit 22 is configured to determine whether a packet received by the reception port group 41 is a factor packet, and output, to the second distribution unit 23, a packet that is not the factor packet. However, each of the first distribution unit 22 and the second distribution unit 23 may determine whether a packet received by the reception port group 41 is a factor packet. Alternatively, the second distribution unit 23 may determine whether a packet received by the reception port group 41 is a factor packet, and output the factor packet to the first distribution unit 22.

Next, an example of a method for determining a physical link being a distribution destination of a factor packet in the first distribution unit 22 is described. The first distribution unit 22 determines a physical link being a distribution destination of a factor packet among activated physical ports belonging to an LAG. The determination is made, for example preferentially based on satisfying the following determination criteria. When there are a plurality of physical links satisfying either of the determination criteria, it is assumed that priority is made in the order of; determination criterion 1>determination criterion 2>determination criterion 3.

Determination criterion 1: a physical link that is currently used by a factor packet (exception: a failure link, and the like)
Determination criterion 2: a physical link in which a remaining band is maximum
Determination criterion 3: a physical link that is not used by another factor packet It is assumed that the first distribution unit 22 sets a physical link other than a physical link that is down, as a distribution destination of a factor packet, except for a case that all transmission ports in the transmission port group 44 are link down. When link down occurs in a physical link being a distribution destination of a factor packet, the first distribution unit 22 changes the distribution destination of the factor packet.

It is desirable that the first distribution unit 22 does not change a distribution destination determined for a certain factor packet as much as possible. This is in order to avoid a problem, which may occur in a case that changeover has occurred in the order of arrival of packets due to a change of a distribution destination.

When a distribution destination of a factor packet is changed, it is desirable that the first distribution unit 22 determines the distribution destination by prioritizing a factor packet in which a usage band is large as possible.

Although it is possible to distribute a plurality of factor packets to one physical link, it is desirable to set in such a way that distribution destinations of the plurality of factor packets become different physical links as much as possible. A usage band included in the setting information received by the setting reception unit 45 is not an actual usage band of a factor packet, but is an expected usage band based on a usage band in the past (second information). Therefore, when the actual usage band is smaller than the expected usage band, a vacant band is generated. When a packet other than a factor packet is distributed to a physical link being a distribution destination of the factor packet, the above-described vacant band is used by another packet, and the transmitting efficiency can be further enhanced.

It is desirable that the first distribution unit 22 determines a distribution destination in such a way that a total of a usage band of a factor packet to be distributed to a certain physical link does not exceed a maximum available band of the physical link. This is because when a total of an actual usage band of a factor packet to be distributed to a certain physical link exceeds a maximum available band of the physical link, a packet is discarded by congestion.

Next, a method for determining a distribution rule of a packet other than a factor packet in the second distribution unit 23 is described.

First, the second distribution unit 23 calculates a remaining band by subtracting, from a maximum available band of the physical link, an (expected) usage band of a factor packet for each of physical links. Regarding a physical link in which the remaining band is lower than 0, hereinafter, the remaining band of the physical link is regarded as 0.

The second distribution unit 23 determines a distribution rule in such a way that a ratio of the number of pieces of identification information (key) of a packet to be distributed to each of physical links becomes equal to a ratio of a remaining band. When remaining bands of all the physical links are 0, the second distribution unit 23 determines a distribution rule by a ratio of a maximum available band of each of the physical links.

Next, an advantageous effect of the transmission monitoring device 10 and the transmission device 40 according to the present example embodiment is described.

The transmission device 40 according to the present example embodiment distributes a packet that is not a factor packet according to a ratio of a remaining band from which the factor packet is removed. Therefore, the transmitting efficiency of a physical link constituting an LAG is enhanced.

For example, it is assumed that an LAG is constituted of a physical link A and a physical link B in which a maximum available band is 10 Gbps, and a packet of 8 Gbps in which identification information is "a" constantly flows through the physical link A. Further, it is assumed that a usage band of another packet (a packet in which identification information is not "a") is equal with respect to each of pieces of identification information (key). At this occasion, when it is assumed that the number of pieces of identification information to be distributed to each of the physical links is the same, when a total of a usage band of the another packet becomes 4 Gbps, the band usage rate of the physical link A becomes 100%. Then, when a total of a usage band of the another packet is 12 Gbps, a packet of 4 Gbps is discarded in the physical link A.

Even when a physical link C in which a maximum available band is 10 Gbps is added to the LAG, when a total of a usage band of the another packet reaches 6 Gbps (remaining band (2) of the physical link A×the number of physical links (3)), a band usage rate of the physical link A becomes 100%. When a total of a usage band of the another packet further increases, a packet is discarded in the physical link A.

In contrast, when the transmission monitoring device 10 according to the present example embodiment sets, in the transmission device 40, a packet of 8 Gbps in which identification information is "a" as a factor packet, the transmission device 40 distributes the packet of 8 Gbps in which identification information is "a" to the physical link A. The transmission device 40 distributes another packet to the physical link A and the physical link B at a ratio of (10-8):10. Consequently, the transmission device 40 is enabled to transmit a packet up to 20 Gbps in total. When the physical link C is added to the LAG, the transmission device 40 is enabled to transmit a packet up to 30 Gbps in total.

When there is imbalance in a physical link constituting an LAG, the transmission monitoring device 10 according to the present example embodiment estimates a factor packet serving as a factor of the imbalance. Then, the transmission device 40 distributes a packet that is not the factor packet according to a ratio of a remaining band from which the factor packet is removed. The factor packet is not based on a priority of a packet. Further, the transmission device 40 does not guarantee a band of the factor packet. Therefore, even when a total of a maximum available band of a physical link constituting an LAG decreases due to an occurrence of a failure or the like, the transmission device 40 is able to preferentially transmit a packet having a high priority, as far as there is a packet having a priority higher than that of a factor packet.

By configuring the transmission monitoring device 10 and the transmission device 40 as described above, when there is imbalance in a band usage rate of a physical link constituting an LAG, the transmission monitoring device 10 estimates and outputs a factor packet serving as a factor of the imbalance. The transmission device 40 distributes the factor packet to a physical link being a distribution destination of the factor packet. The transmission device 40 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance the transmitting efficiency of a transmission system using link aggregation.

The transmission monitoring device 10 according to the present example embodiment receives the second information from the sending device 30 for sending a packet passing through a physical link constituting an LAG. Therefore, the transmission monitoring device 10 is enabled to easily grasp the second information relating to a data amount of each of pieces of identification information of the packet passing through the physical link constituting the LAG.

Next, an operation example of the transmission monitoring device 10 according to the present example embodiment is described with reference to FIG. 7.

The first information reception unit 11 receives the first information from the transmission device 40 at a predetermined timing, for example, every one hour. The first information includes information relating to a band usage rate of each of physical links constituting an LAG. It is assumed that the first information reception unit 11 receives, from the transmission device 40, a usage band of each of physical ports of the transmission port group 44, and calculates a band usage rate, based on the usage bands.

The second information reception unit 12 receives the second information at a predetermined timing, for example, every one hour. The second information includes information relating to a data amount of each of pieces of identification information of a packet passing through a physical link constituting the LAG. It is assumed that the second information reception unit 12 receives the second information from the sending device 30.

A reception cycle of each of the first information and the second information may be changeable depending on a time zone. For example, the cycle is short in a time zone when a change is more, and is long in a time zone (such as a nighttime) when a change is less. When the factor packet estimation unit 13 determines that imbalance has occurred, it is also possible to shorten the reception cycle.

It is assumed that the factor packet estimation unit 13 grasps in advance the following information regarding the transmission device 40.

information on a physical link belonging to an LAG
a maximum available band of each of physical links
information as to whether each of physical links is activated
setting information on a factor packet for which setting has been completed
the number of pieces of settable identification information of a factor packet
a distribution rule of a packet other than a factor packet When an available physical link changes due to a failure, link-up/link-down, and the like, the factor packet estimation unit 13 receives a notification from the transmission device 40 that the state has changed, and updates the above-described information.

The factor packet estimation unit 13 confirms whether there is imbalance in a band usage rate of a physical link constituting an LAG, based on the first information at a predetermined timing, for example, every six hours. When there is imbalance in the band usage rate (YES in Step S201), the factor packet estimation unit 13 extracts, from the distribution rule in the transmission device 40, identification information of a packet distributed to a physical link being a factor of the imbalance (Step S202). The physical link being the factor of the imbalance is, for example, a physical link in which a band usage rate is maximum among physical links constituting the LAG.

Next, the factor packet estimation unit 13 estimates identification information of the factor packet from the extracted identification information, based on the second information (Step S203). For example, the factor packet estimation unit 13 estimates, as the identification information of the factor packet, identification information in which a transmission data amount in the sending device 30 is maximum from the extracted identification information.

Next, the factor packet estimation unit 13 determines setting information of the factor packet to be set in the transmission device 40 (Step S204). The factor packet estimation unit 13 adds, to the setting information for the transmission device 40, information on the factor packet estimated in Step S203. The factor packet estimation unit 13 updates the usage band of the setting information, based on the second information.

Then, the factor packet estimation unit 13 outputs, to the transmission device 40, the setting information of the factor packet (Step S205).

Next, an operation example of the transmission device 40 according to the present example embodiment is described with reference to FIG. 8 and FIG. 4. FIG. 8 is an operation example relating to a change of a distribution rule, and FIG. 4 is an operation example when the transmission device 40 receives a packet. The operation in FIG. 8 may be performed by the transmission monitoring device 10.

First, it is assumed that the first distribution unit 22 and the second distribution unit 23 grasp in advance the following information regarding the transmission port group 44.
  information on a physical link belonging to an LAG
  a maximum available band of each of physical links
  information as to whether each of physical links is activated When an event serving as a trigger for changing a distribution rule occurs (Step S206), first, the first distribution unit 22 of the transmission device 40 determines a physical link being a distribution destination for each of factor packets (Step S207).

The event serving as a trigger for changing a distribution rule is, for example, reception of setting information from the transmission monitoring device 10, changing an available physical link, and the like.

When the setting information of the factor packet is received from the transmission monitoring device 10, the transmission device 40 determines a physical link being a distribution destination of the factor packet. When the physical link being the distribution destination of the factor packet is down, the transmission device 40 changes the distribution destination of the factor packet to a physical link that is not down. Also when information relating to the physical link changes due to a reason such as link-up/link-down, addition/deletion of a new physical link, and the like, the transmission device 40 changes the distribution destination of the factor packet, or changes the distribution rule of a packet that is not the factor packet.

Next, the second distribution unit 23 calculates a remaining band by subtracting, from a maximum available band, a usage band of the factor packet for each of physical links (Step S208). Then, the second distribution unit 23 determines a distribution rule of a packet that is not the factor packet, based on the remaining band of each of the physical links (Step S209). The first distribution unit 22 transmits, to the transmission monitoring device 10, information on the distribution destination of the factor packet, and the second distribution unit 23 transmits, to the transmission monitoring device 10, information on the distribution rule of a packet that is not the factor packet (Step S210).

Further, the reception port group 41 receives a packet from the sending device 30 (Step S111 in FIG. 4). When the received packet is the factor packet (YES in Step S112), the first distribution unit 22 distributes the received packet to the physical link being the distribution destination of the factor packet (Step S113).

When the received packet is not the factor packet (NO in Step S112), the first distribution unit 22 outputs the received packet to the second distribution unit 23. Then, the second distribution unit 23 distributes the received packet in accordance with the distribution rule of a packet that is not the factor packet (Step S114).

Then, the transmission port group 44 transfers the packet to the opposing device 50. When the packet is discarded by priority control and the like, or when link-down/link-up occurs, the transmission port group 44 notifies the first distribution unit 22, the second distribution unit 23, and the transmission monitoring unit 10 of this matter (Step S206).

By being operated as described above, when there is imbalance in a band usage rate of a physical link constituting an LAG, the transmission monitoring device 10 estimates and outputs a factor packet serving as a factor of the imbalance. The transmission device 40 distributes the factor packet to a physical link being a distribution destination of the factor packet. The transmission device 40 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance the transmitting efficiency of a transmission system using link aggregation.

As described above, in the second example embodiment according to the present invention, when there is imbalance in a band usage rate of a physical link constituting an LAG, the transmission monitoring device 10 estimates and outputs a factor packet serving as a factor of the imbalance. The transmission device 40 distributes the factor packet to a physical link being a distribution destination of the factor packet. The transmission device 40 distributes a packet that is not the factor packet in accordance with a distribution rule based on a remaining band, which is acquired by subtracting, from a maximum available band of the physical link, a usage band of the factor packet in which the physical link is a distribution destination. Thus, a packet that is not the factor packet is distributed according to the remaining band from which the usage band of the factor packet serving as a factor of imbalance in the band usage rate is removed. Therefore, it becomes possible to reduce a possibility that a packet is discarded in a state that there is a vacant band in the LAG. Thus, it becomes possible to enhance the transmitting efficiency of a transmission system using link aggregation.

The transmission monitoring device 10 according to the present example embodiment receives the second information from the sending device 30 for sending a packet passing through a physical link constituting an LAG. Therefore, the transmission monitoring device 10 is enabled to easily grasp the second information relating to a data amount of each of pieces of identification information of the packet passing through the physical link constituting the LAG.

[Hardware Configuration Example]

A configuration example of a hardware resource for achieving the transmission monitoring device (10) and the transmission device (20, 40) (hereinafter, a transmission monitoring device and the like) according to the above-described example embodiments of the present invention by using one information processing device (computer) is described. The transmission monitoring device and the like may be physically or functionally achieved by using at least two information processing devices. The transmission monitoring device and the like may be achieved as a dedicated device. Alternatively, only a part of functions of the transmission monitoring device and the like may be achieved by using an information processing device.

FIG. 9 is a diagram schematically illustrating a hardware configuration example of an information processing device capable of achieving the transmission monitoring device and the like according to the example embodiments of the present invention. An information processing device 90 includes a communication interface 91, an input/output interface 92, an arithmetic device 93, a storage device 94, a non-volatile storage device 95, and a drive device 96.

The communication interface 91 is a communication means via which the transmission monitoring device and the like according to the example embodiments wiredly and/or wirelessly communicate with an external device. When the transmission monitoring device and the like are achieved by using at least two information processing devices, these devices may be connected to be mutually communicable via the communication interface 91.

The input/output interface 92 is a man machine interface such as a keyboard being one example of an input device, a display as an output device, and the like.

The arithmetic device 93 is an arithmetic processing device such as a general-purpose central processing unit (CPU), a microprocessor, and the like. For example, the arithmetic device 93 is enabled to read various programs stored in the non-volatile storage device 95 into the storage device 94, and perform processing in accordance with the read programs.

The storage device 94 is a memory device referable from the arithmetic device 93, such as a random access memory (RAM), and stores a program, various types of data, and the like. The storage device 94 may be a volatile memory device.

The non-volatile storage device 95 is, for example, a non-volatile storage device such as a read only memory (ROM), and a flash memory, and is capable of storing various types of programs, data, and the like.

The drive device 96 is, for example, a device for processing reading and writing of data with respect to a recording medium 97 to be described later.

The recording medium 97 is, for example, any recording medium capable of recording data, such as an optical disc, a magneto-optical disk, a semiconductor flash memory, and the like.

Each of the example embodiments according to the present invention may be achieved, for example, by constituting the transmission monitoring device and the like by the information processing device 90 exemplified in FIG. 9, and supplying, to the transmission monitoring device and the like, a program capable of achieving a function described in each of the above-described example embodiments.

In this case, it is possible to achieve an example embodiment by causing the arithmetic device 93 to execute the program supplied to the transmission monitoring device and the like. Further, it is also possible to configure not all the functions of the transmission monitoring device and the like but a part of the functions by the information processing device 90.

The above-described program may be recorded in the recording medium 97, and the above-described program may be stored in the non-volatile storage device 95 as necessary at shipment of the transmission monitoring device and the like, at an operational stage, or the like. In this case, a method for supplying the above-described program may employ a method for installing the program in the transmission monitoring device and the like by using an appropriate jig at a production stage before shipment, at an operational stage, or the like. A method for supplying the above-described program may employ a general procedure such as a method for downloading the program from the outside via a communication line such as the Internet.

A part or all of the above-described example embodiments may be described as the following supplementary notes, but the example embodiments are not limited by the following.

(Supplementary Note 1)

A transmission monitoring device including:

a first information reception means for receiving first information relating to a band usage rate of each of physical links constituting a link aggregation group;

a second information reception means for receiving second information relating to a data amount of each of pieces of identification information of a packet passing through the physical link; and a factor packet estimation means for, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

(Supplementary Note 2)

The transmission monitoring device according to supplementary note 1, wherein the factor packet estimation means determines that the imbalance is present, when there is a difference exceeding a first value between an average value and a maximum value of the band usage rates of the physical links constituting the link aggregation group.

(Supplementary Note 3)

The transmission monitoring device according to supplementary note 1 or 2, wherein the factor packet estimation means extracts, from the distribution rule, the identification information of the packet in which the physical link being a factor of the imbalance is the distribution destination, and estimates the identification information of the factor packet from the extracted identification information.

(Supplementary Note 4)

The transmission monitoring device according to supplementary note 3, wherein the physical link being a factor of the imbalance is the physical link in which the band usage rate is maximum among the physical links constituting the link aggregation group, or the physical link in which the band usage rate is larger than a sum of an average value of the band usage rates of the physical links constituting the link aggregation group, and a second value.

(Supplementary Note 5)

The transmission monitoring device according to supplementary note 3 or 4, wherein the factor packet estimation means estimates, as the identification information of the factor packet, the identification information in which the data amount is maximum among the extracted identification information, or the identification information in which a ratio of the data amount to a total value of the data amount of the extracted identification information exceeds a predetermined ratio.

(Supplementary Note 6)

The transmission monitoring device according to any one of supplementary notes 1 to 5, wherein the factor packet estimation means further outputs the data amount of the factor packet.

(Supplementary Note 7)

The transmission monitoring device according to any one of supplementary notes 1 to 6, wherein the first information reception means receives the first information from a transmission device that transmits the packet by using the physical link constituting the link aggregation group.

(Supplementary Note 8)

The transmission monitoring device according to supplementary note 7, wherein the transmission device transmits the packet to the physical link.

(Supplementary Note 9)

The transmission monitoring device according to any one of supplementary notes 1 to 8, wherein the second information reception means receives the second information from a sending device that sends the packet passing through the physical link.

(Supplementary Note 10)

A transmission device including:

a packet reception means for receiving a packet;

a first distribution means for, when the received packet is a factor packet serving as a factor of imbalance in a band usage rate of a physical link constituting a link aggregation group, distributing the received packet to a physical link being a distribution destination of the factor packet; and a second distribution means for, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

(Supplementary Note 11)

The transmission device according to supplementary note 10, wherein the first distribution means determines the distribution destination of the factor packet.

(Supplementary Note 12)

The transmission device according to supplementary note 10 or 11, wherein the second distribution means determines the distribution rule.

(Supplementary Note 13)

The transmission device according to supplementary note 12, wherein the second distribution means determines the distribution rule in such a way that a ratio of the remaining band of the physical link, and a ratio of the number of pieces of the identification information in which the physical link is the distribution destination are equal to each other.

(Supplementary Note 14)

The transmission device according to any one of supplementary notes 10 to 13, further including a setting reception means for receiving setting information including the identification information and the usage band of the factor packet.

(Supplementary Note 15)

A transmission system including:

the transmission monitoring device according to any one of supplementary notes 1 to 6; and a transmission device that transmits the packet by using the physical link constituting the link aggregation group.

(Supplementary Note 16)

A transmission system including:

the transmission monitoring device according to supplementary note 7 or 8; and the transmission device.

(Supplementary Note 17)

A transmission system including:

the transmission monitoring device according to supplementary note 9;

the sending device; and a transmission device that transmits the packet by using the physical link constituting the link aggregation group.

(Supplementary Note 18)

The transmission system according to any one of supplementary notes 15 to 17, wherein the transmission device is the transmission device according to any one of supplementary notes 10 to 14.

(Supplementary Note 19)

A transmission monitoring method including:

receiving first information relating to a band usage rate of each of physical links constituting a link aggregation group;

receiving second information relating to a data amount of each of pieces of identification information of a packet passing through the physical link; and, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

(Supplementary Note 20)

The transmission monitoring method according to supplementary note 19, further including determining that the imbalance is present, when there is a difference exceeding a first value between an average value and a maximum value of the band usage rates of the physical links constituting the link aggregation group.

(Supplementary Note 21)

The transmission monitoring method according to supplementary note 19 or 20, further including extracting, from the distribution rule, the identification information of the packet in which the physical link being a factor of the imbalance is the distribution destination, and estimating the identification information of the factor packet from the extracted identification information.

(Supplementary Note 22)

The transmission monitoring method according to supplementary note 21, wherein the physical link being a factor of the imbalance is the physical link in which the band usage rate is maximum among the physical links constituting the link aggregation group, or the physical link in which the band usage rate is larger than a sum of an average value of the band usage rates of the physical links constituting the link aggregation group, and a second value.

(Supplementary Note 23)

The transmission monitoring method according to supplementary note 21 or 22, further including estimating, as the identification information of the factor packet, the identification information in which the data amount is maximum among the extracted identification information, or the identification information in which a ratio of the data amount to a total value of the data amount of the extracted identification information exceeds a predetermined ratio.

(Supplementary Note 24)

The transmission monitoring method according to any one of supplementary notes 19 to 23, further including outputting the data amount of the factor packet.

(Supplementary Note 25)

The transmission monitoring method according to any one of supplementary notes 19 to 24, further including receiving the first information from a transmission device that transmits the packet by using the physical link constituting the link aggregation group.

(Supplementary Note 26)

The transmission monitoring method according to supplementary note 25, wherein the transmission device transmits the packet to the physical link.

(Supplementary Note 27)

The transmission monitoring method according to any one of supplementary notes 19 to 26, further including receiving the second information from a sending device that sends the packet passing through the physical link.

(Supplementary Note 28)

A transmission method including:

receiving a packet;

when the received packet is a factor packet serving as a factor of imbalance in a band usage rate of a physical link constituting a link aggregation group, distributing the received packet to a physical link being a distribution destination of the factor packet; and when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

(Supplementary Note 29)

The transmission method according to supplementary note 28, further including determining the distribution destination of the factor packet.

(Supplementary Note 30)

The transmission method according to supplementary note 28 or 29, further including determining the distribution rule.

(Supplementary Note 31)

The transmission method according to supplementary note 30, further including determining the distribution rule in such a way that a ratio of the remaining band of the physical link, and a ratio of the number of pieces of the identification information in which the physical link is the distribution destination are equal to each other.

(Supplementary Note 32)

The transmission method according to any one of supplementary notes 28 to 31, further including receiving setting information including the identification information and the usage band of the factor packet.

(Supplementary Note 33)

The transmission method according to any one of supplementary notes 28 to 32, further including:

receiving first information relating to the band usage rate of each of the physical links constituting the link aggregation group;

receiving second information relating to a data amount of each of pieces of the identification information of the packet passing through the physical link; and when there is imbalance in the band usage rate of the physical link constituting the link aggregation group, outputting the identification information of the factor packet, which is estimated based on the distribution rule and the second information.

(Supplementary Note 34)

A computer-readable recording medium recording a transmission monitoring program causing a computer to achieve:

a first information reception function of receiving first information relating to a band usage rate of each of physical links constituting a link aggregation group;

a second information reception function of receiving second information relating to a data amount of each of pieces of identification information of a packet passing through the physical link; and a factor packet estimation function of, when there is imbalance in the band usage rate of the physical link constituting the link aggregation group, outputting the identification information of a factor packet serving as a factor of the imbalance, which is estimated based on a distribution rule indicating a correspondence between the identification information of the packet and the physical link being a distribution destination of the packet, and the second information.

(Supplementary Note 35)

The computer-readable recording medium recording the transmission monitoring program according to supplementary note 34, wherein the factor packet estimation function determines that the imbalance is present, when there is a difference exceeding a first value between an average value and a maximum value of the band usage rates of the physical links constituting the link aggregation group.

Supplementary Note 36

The computer-readable recording medium recording the transmission monitoring program according to supplementary note 34 or 35, wherein the factor packet estimation function extracts, from the distribution rule, the identification information of the packet in which the physical link being a factor of the imbalance is the distribution destination, and estimates the identification information of the factor packet from the extracted identification information.

(Supplementary Note 37)

The computer-readable recording medium recording the transmission monitoring program according to supplementary note 36, wherein the physical link being a factor of the imbalance is the physical link in which the band usage rate is maximum among the physical links constituting the link aggregation group, or the physical link in which the band usage rate is larger than a sum of an average value of the band usage rates of the physical links constituting the link aggregation group, and a second value.

(Supplementary Note 38)

The computer-readable recording medium recording the transmission monitoring program according to supplementary note 36 or 37, wherein the factor packet estimation function estimates, as the identification information of the factor packet, the identification information in which the data amount is maximum among the extracted identification information, or the identification information in which a ratio of the data amount to a total value of the data amount of the extracted identification information exceeds a predetermined ratio.

(Supplementary Note 39)

The computer-readable recording medium recording the transmission monitoring program according to any one of supplementary notes 34 to 38, wherein the factor packet estimation function further outputs the data amount of the factor packet.

Supplementary Note 40

The computer-readable recording medium recording the transmission monitoring program according to any one of supplementary notes 34 to 39, wherein the first information reception function receives the first information from a transmission device that transmits the packet by using the physical link constituting the link aggregation group.

(Supplementary Note 41)

The computer-readable recording medium recording the transmission monitoring program according to supplementary note 40, wherein the transmission device transmits the packet to the physical link.

(Supplementary Note 42)

The computer-readable recording medium recording the transmission monitoring program according to any one of supplementary notes 34 to 41, wherein the second information reception function receives the second information from a sending device that sends the packet passing through the physical link.

(Supplementary Note 43)

A computer-readable recording medium recording a transmission program causing a computer to achieve:

a packet reception function of receiving a packet;

a first distribution function of, when the received packet is a factor packet serving as a factor of imbalance in a band usage rate of a physical link constituting a link aggregation group, distributing the received packet to a physical link being a distribution destination of the factor packet; and a second distribution function of, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

(Supplementary Note 44)

The computer-readable recording medium recording the transmission program according to supplementary note 43, wherein the first distribution function determines the distribution destination of the factor packet.

(Supplementary Note 45)

The computer-readable recording medium recording the transmission program according to supplementary note 43 or 44, wherein the second distribution function determines the distribution rule.

(Supplementary Note 46)

The computer-readable recording medium recording the transmission program according to supplementary note 45, wherein the second distribution function determines the distribution rule in such a way that a ratio of the remaining band of the physical link, and a ratio of the number of pieces of the identification information in which the physical link is the distribution destination are equal to each other.

(Supplementary Note 47)

The computer-readable recording medium recording the transmission program according to any one of supplementary notes 43 to 46, further causing a computer to achieve a setting reception function of receiving setting information including the identification information and the usage band of the factor packet.

While the invention has been particularly shown and described with reference to example embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2018-033080, filed on Feb. 27, 2018, the disclosure of which is incorporated herein in its entirety by reference.

REFERENCE SIGNS LIST

10 Transmission monitoring device
11 First information reception unit
12 Second information reception unit
13 Factor packet estimation unit
20, 40 Transmission device
21 Packet reception unit
22 First distribution unit
23 Second distribution unit
30 Sending device
41 Reception port group
44 Transmission port group
45 Setting reception unit
50 Opposing device
60 Reception device
90 Information processing device
91 Communication interface
92 Input/output interface
93 Arithmetic device
94 Storage device
95 Non-volatile storage device
96 Drive device
97 Recording medium

What is claimed is:

1. A transmission device comprising one or more memories storing executable instructions and one or more processors configured to execute the instructions to:
receive a packet;
when the received packet is a factor packet serving as a factor of imbalance in a band usage rate of a physical link constituting a link aggregation group, distribute the received packet to a physical link being a distribution destination of the factor packet; and when the received packet is not the factor packet, distribute the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

2. The transmission device according to claim 1, wherein the one or more processors are configured to execute the instructions to
determine the distribution destination of the factor packet.

3. The transmission device according to claim 2, wherein the one or more processors are configured to execute the instructions to
determine the distribution rule.

4. The transmission device according to claim 2, wherein the one or more processors are configured to execute the instructions to
receive setting information including the identification information and the usage band of the factor packet.

5. The transmission device according to claim 1, wherein the one or more processors are configured to execute the instructions to
determine the distribution rule.

6. The transmission device according to claim 5, wherein
determine the distribution rule in such a way that a ratio of the remaining band of the physical link, and a ratio of a number of pieces of the identification information in which the physical link is the distribution destination are equal to each other.

7. The transmission device according to claim 6, wherein the one or more processors are configured to execute the instructions to
receive setting information including the identification information and the usage band of the factor packet.

8. The transmission device according to claim 5, wherein the one or more processors are configured to execute the instructions to
receive setting information including the identification information and the usage band of the factor packet.

9. The transmission device according to claim 1, further comprising
receive setting information including the identification information and the usage band of the factor packet.

10. A transmission method comprising:
receiving a packet;
distributing the received packet to a physical link being a distribution destination of the factor packet when the received packet is a factor packet serving as a factor of imbalance in a band usage rate of a physical link constituting a link aggregation group; and,
distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet when the received packet is not the factor packet.

11. The transmission method according to claim 10, further comprising
determining the distribution destination of the factor packet.

12. The transmission method according to claim 10, further comprising
determining the distribution rule.

13. The transmission method according to claim 12, further comprising
determining the distribution rule in such a way that a ratio of the remaining band of the physical link, and a ratio of a number of pieces of the identification information in which the physical link is the distribution destination are equal to each other.

14. The transmission method according to claim 10, further comprising
receiving setting information including the identification information and the usage band of the factor packet.

15. The transmission method according to claim 10, further comprising:
receiving first information relating to the band usage rate of each of the physical links constituting the link aggregation group;
receiving second information relating to a data amount of each of pieces of the identification information of the packet passing through the physical link; and,
outputting the identification information of the factor packet, which is estimated based on the distribution rule and the second information when there is imbalance in the band usage rate of the physical link constituting the link aggregation group.

16. A non-transitory computer-readable recording medium recording a transmission program causing a computer to achieve:
a packet reception function of receiving a packet;
a first distribution function of, when the received packet is a factor packet serving as a factor of imbalance in a band usage rate of a physical link constituting a link aggregation group, distributing the received packet to a physical link being a distribution destination of the factor packet; and
a second distribution function of, when the received packet is not the factor packet, distributing the received packet in accordance with a distribution rule based on a remaining band, which is acquired by subtracting, from a maximum available band of the physical link, a usage band of the factor packet in which the physical link is the distribution destination for each of the physical links constituting a link aggregation group, the distribution rule indicating a correspondence between identification information of the packet and the physical link being the distribution destination of the packet.

17. The non-transitory computer-readable recording medium recording the transmission program according to claim 16, wherein
the first distribution function determines the distribution destination of the factor packet.

18. The non-transitory computer-readable recording medium recording the transmission program according to claim 16, wherein
the second distribution function determines the distribution rule.

19. The non-transitory computer-readable recording medium recording the transmission program according to claim 18, wherein
the second distribution function determines the distribution rule in such a way that a ratio of the remaining band of the physical link, and a ratio of a number of pieces of the identification information in which the physical link is the distribution destination are equal to each other.

20. The non-transitory computer-readable recording medium recording the transmission program according to claim 16, further causing a computer to achieve
   a setting reception function of receiving setting information including the identification information and the usage band of the factor packet.

* * * * *